July 13, 1926.  
W. G. HOUSKEEPER  
APPARATUS FOR VACUUM TUBE MANUFACTURE  
Filed Dec. 13, 1923
1,592,365
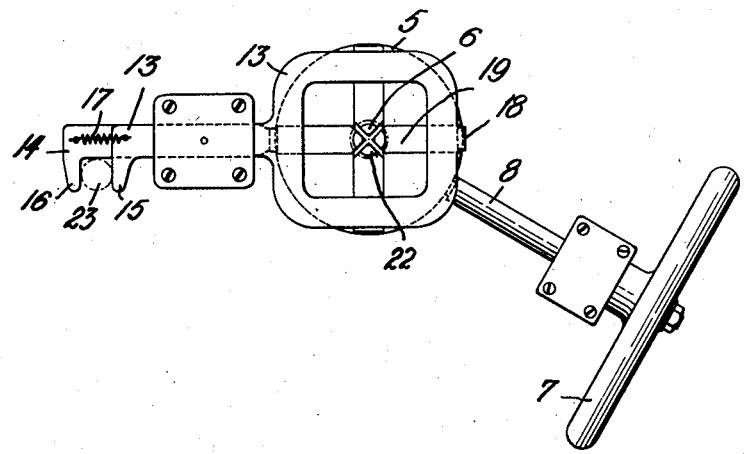
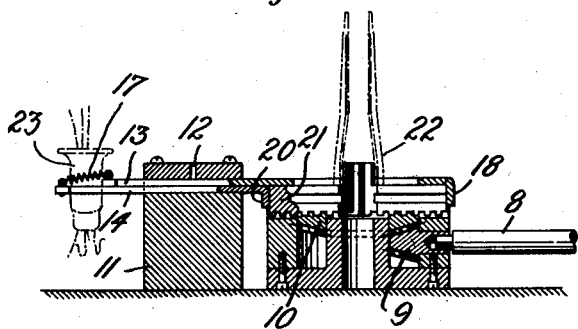
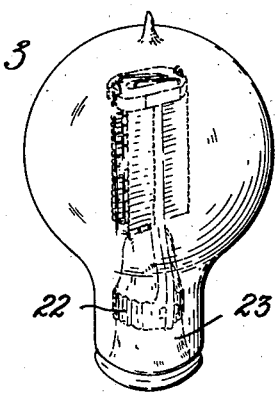
Inventor:
William G. Houskeeper,
by E. W. Adams, Atty Patented July 13, 1926.

1,592,365

UNITED STATES PATENT OFFICE.

WILLIAM G. HOUSKEEPER, OF EAST ORANGE, NEW JERSEY, ASSIGNOR TO WESTERN ELECTRIC COMPANY, INCORPORATED, OF NEW YORK, N. Y., A CORPORATION OF NEW YORK.

APPARATUS FOR VACUUM-TUBE MANUFACTURE.

Application filed December 13, 1923. Serial No. 680,344.

This invention relates to apparatus for the manufacture of vacuum tubes.

In certain types of vacuum tubes the electrodes are supported by means of a supporting collar which is held by friction to the stem of the tube. It is necessary in the manufacture of such tubes to provide a very close fit between the supporting collar and the particular stem with which the supporting collar is to be used. It is commercially impractical to obtain glass tubing for the stems of such vacuum tubes which is uniform in diameter and in consequence the collars are provided with crimps as shown in my Patent No. 1,536,855, issued May 5, 1925. It has been found commercially that it is desirable to expand the collars until their inside diameters are only slightly less than the outside diameters of the stems with which they are to be used. It is, therefore, the object of the present invention to provide a reliable and efficient device for expanding the collar of the supporting electrode to fit a particular stem.

Referring now to the drawing, there is shown in Figure 1, a plan view illustrating one embodiment of the invention. Fig. 2 is a view partly in section of the mechanism shown in Fig. 1. Fig. 3 is a view of a vacuum tube showing the arrangement of the supporting collar with respect to its stem.

In Fig. 1, there is shown an expansion chuck 5 which has a plurality of jaws 6. These jaws 6 are arranged to be moved in accordance with the movement of a wheel or handle 7. This wheel or handle 7 is secured to a shaft 8 which has one end fitted in an aperture of a bevelled gear 9, as is more clearly shown in Fig. 2. The teeth of the bevelled gear 9 mesh with the teeth of a second bevelled gear 10 which has arranged on its upper surface a spiral gear. Each of the jaws 6 is provided with a projecting portion which engages the teeth in this spiral gear and are thus moved in either an outward or inward direction in accordance with the direction of rotation of the bevelled gear 9.

Supported by a block 11 and movable in accordance with the movement of the jaws 6 are a pair of members 13 and 14. In order to permit the easy movement of the members 13 and 14, an oil hole 12 is drilled in the top of the block 11 through which oil may be passed for lubricating the members 13 and 14. Each of the members 13 and 14 is provided with caliper-like portions 15 and 16 respectively and are held in a normal position by means of a retractile spring 17 having one end secured to each of these members. As is shown in Fig. 1, the member 13 extends over the surface of the chuck 5 and has an aperture therein for permitting the movement of the jaws 6. The end of the member 13, opposite to that carrying the jaw 15 is provided with a downwardly projecting portion 18 which is arranged in alignment with the member 19 which moves in accordance with one of the jaws 6. Likewise, the member 14 is provided with a downwardly projecting portion 20 in the path of member 21 which, like member 19, is moved in accordance with the movement of one of the jaws 6. It is thus seen that when the jaws 6 are moved in accordance with the rotation of the bevelled gear 9, the members 13 and 14 will be caused to follow the movement of these jaws.

A better understanding of the invention may be had from the following description of the operation. Assume now that it is desired to expand a collar 22 which carries the electrodes of the vacuum tube to fit a particular stem 23. The collar is placed around the jaws 6 and the wheel or handle 7 moved for causing the rotation of the bevelled gear 9 and the outward movement of the jaws 6. The jaws 6 are thus moved, moving with them the members 13 and 14, thus increasing the opening between the caliper-like members 15 and 16. Jaws 6 engage the collar 22 and effect its expansion. When it is thought that the collar has been expanded sufficiently to fit the stem 23, an attempt is made to insert this stem between the caliper-like members 15 and 16. Of course, if the operator is unable to insert the stem 23 between the caliper-like members 15 and 16, it is necessary for the collar to be further expanded. In such case, the wheel 7 would be rotated for causing an additional movement of the jaws 6, and consequently the further expansion of the collar 22. This process is continued until the stem 23 can be inserted between the caliper-like members 15 and 16, at which time the collar 22 has been expanded to fit the stem 23.

In order that there will be a close fit between the collar 22 and the stem 23, the jaws 6 are made slightly smaller than the actual amount of expansion necessary for enlarging the collar 22 to a point where it will easily slide over the stem 23. It is thus seen that with such an arrangement, the collar 22 will be a little smaller than the stem 23 but not enough to prevent the collar 22 being forced over the stem 23.

Following the mounting of the collar 22 on the stem 23, the other electrodes are secured to the supports which are then inserted in an enclosing vessel, as shown in Fig. 3.

Although the invention has been disclosed and described in reference to a particular type of apparatus it is, of course, obvious that various modifications may be made without departing from the spirit and scope of the present invention.

What is claimed is:

1. A device for expanding the electrode supporting collars of vacuum tubes to fit a particular stem comprising an expansion chuck, and a pair of members moved in accordance with the movement of the chuck for determining the amount of movement necessary for the collar to fit a particular stem.

2. A device for expanding an electrode supporting collar of vacuum tubes to fit a particular stem comprising an expansion device and means operable in accordance with said expansion device for determining the amount of expansion necessary for the collar to fit a particular stem.

3. A device for expanding an electrode supporting collar of a vacuum tube to fit a particular stem comprising expansion means to receive said collar, means to operate said expansion means, and means operated in accordance with the movement of the expansion device for determining when said collar has been expanded sufficiently to fit said means.

4. A device for expanding an electrode supporting collar to fit a particular stem comprising an expansion device to receive said collar, and a pair of members moved in opposite directions in accordance with the operation of said expansion device for determining when said collar has been expanded sufficiently to fit said stem.

5. A device for expanding an electrode supporting collar of a vacuum tube to fit a particular stem comprising an expansion device to receive said collar, a pair of members moved in opposite directions in accordance with the operation of said expansion device, and caliper-like portions carried by said members for determining when said collar has been expanded sufficiently to fit said stem.

6. A device for expanding an electrode supporting collar to fit a particular stem comprising an expansion screw chuck having a plurality of jaws arranged to receive said collar, a pair of members movable in opposite directions in accordance with the movement of said jaws, and means formed by said members to gauge the size of said collar to fit said stem.

7. In combination, expansion means adapted to receive an electrode supporting collar, a pair of movable members adapted to receive the stem of a vacuum tube, means to operate said expansion means, connections between said expansion means and said movable members to operate the latter in accordance with the former, whereby when the movable members are operated sufficiently to receive a stem, the collar on the expansion means is of proper size to fit over said stem.

In witness whereof, I hereunto subscribe my name this 11 day of December A. D., 1923.

WILLIAM G. HOUSKEEPER.